United States Patent [19]

Phillips et al.

[11] 4,090,062
[45] May 16, 1978

[54] ENERGY DEMAND CONTROLLER AND METHOD THEREFOR

[75] Inventors: Alvin Carson Phillips, Aurora; James Stephen Cumbach, Denver, both of Colo.

[73] Assignee: Phillips Control Corp., Denver, Colo.

[21] Appl. No.: 704,184

[22] Filed: Jul. 12, 1976

[51] Int. Cl.² .............................................. H05B 3/02
[52] U.S. Cl. .................................... 219/486; 219/485
[58] Field of Search ................. 165/22; 219/480, 483, 219/484, 485, 486, 476, 487; 307/39

[56] References Cited

U.S. PATENT DOCUMENTS

| | | | |
|---|---|---|---|
| 3,351,739 | 11/1967 | Eckman | 219/486 X |
| 3,489,913 | 1/1970 | Wildi | 219/485 |
| 3,906,242 | 9/1975 | Stevenson | 219/485 |
| 4,020,358 | 4/1977 | Wyland | 307/39 |

*Primary Examiner*—J. V. Truhe
*Assistant Examiner*—Fred E. Bell
*Attorney, Agent, or Firm*—Burton & Dorr

[57] ABSTRACT

An energy demand controller adaptable for a house or building having a plurality of heating zones and appliances. The energy demand controller includes a temperature sensor for each zone, a central controller receptive of all the temperatures from each zone for comparing the sensed temperature to a predetermined value, and a switch panel having solid state switches responsive to commands from the central controller for selectively delivering power from a power source to the heaters and appliances. When the zones require heating because of a first predetermined temperature difference between the sensed temperature and the desired temperature, then the heaters for the various zones are sequentially activated for a short predetermined time interval. When a greater temperature difference exists between the desired level and the sensed level in a particular zone, the heaters for that zone are activated full time. In the event that a given number of such zones have their heaters activated full time, then all power to the appliances is optionally turned off thereby preventing simultaneous electrical consumption by heaters and the appliances. Priority is optimally provided to the electrical consumption by the appliances over the short predetermined timed heating of the zones. A novel method is disclosed for activating heaters and appliances in a given order in order to minimize peak power demands.

26 Claims, 11 Drawing Figures

Fig_4

ENERGY DEMAND CONTROLLER AND METHOD THEREFOR

BACKGROUND OF THE INVENTION

1. Field of the Invention

The present invention relates generally to controllers for allocating energy consumption on a priority basis and more particularly to an energy controller designed to be adaptable to conventional housing or office buildings.

2. Description of the Prior Art

Power supply companies have traditionally billed industrial users based upon a demand billing rate. Such a rate structure is desirable since the power supply company must be capable of meeting peak supply demands by it's various industrial users. Therefore, it is highly desirable to bill the industrial users based upon their highest demand for generally a fifteen minute interval during a given month. While industry has responded with a variety of approaches to substantially reduce the occurrence of a peak demand level during a given month through use of a variety of energy allocation devices, none of the above prior art approaches have been found suitable for private residential use.

Power supply companies have been billing residential consumers based upon what is commonly termed the "rate" basis. The "rate" basis for computing power consumption is based upon the concept that the residential user should pay for the power actually used. The philosophy behind this approach being that most consumers live within a predetermined amount of average power consumption so that the power supply company can properly allocate the power requirements to the residential community. Power supply companies in various states are commencing to adopt the demand rate structure for residential users. While some energy controllers designed for industrial applications have been modified for the residential environment, such controllers severely inconvenience the public since as power consumption increases, selected appliances, lights, heaters, and/or outlets are deactivated on a priority basis. Such priority shutoffs often irate consumers and are often disconnected.

The energy demand controller of the present invention meets this new market by providing a low-cost approach for providing energy priority and allocation in order to prevent peak energy uses from occurring. The apparatus and method taught by the present invention for the first time provides a new and novel approach to heating zones or rooms within the building or house by sequentially turning on the heater in each zone for a predetermined length of time, usually one second, thereby preventing the simultaneous activation of all heaters in all zones at the same time. Currently, zone heating occurs at a purely random basis dependent upon the temperature in the particular zone and whether that temperature is at the desired level. The energy demand controller of the present invention turns on the first zone heater for one second etc. then returns back to the first zone and turns it on for an additional second. In the event that the inhabitant of the house or building desires to use an appliance, a special override feature is provided so that while the appliance is being used, no cyclic heating in the zones occurs.

The energy demand controller of the present invention also functions when the temperature in each of the zones falls below a predetermined low value by providing the feature of activating the heater within the zone on a fulltime basis until the temperature rises to a predetermined range. In the event that a certain given number of zones require such full time heating, the energy controller of the present invention prevents any appliance from being activated until the room temperature is brought up to within operational range in a predetermined number of zones. This situation usually occurs when the house is cold and the heat is turned on initially or when the outside temperature is very low. The house must obtain the desired range of living temperatures before the appliances can be activated.

Of course, during normal operation, the heat in the room is at the desired temperature and the energy demand controller will continually interrogate the temperature difference between the actual temperature and the desired temperature for each zone but no heating will occur. In that mode, appliances can be safely utilized. It is only when the temperature within a particular zone commences to drop that priority action occurs in the allocation of power consumption.

OBJECTS OF THE INVENTION

It is an object of the present invention to provide a new and novel apparatus for controlling energy consumption within a building.

It is a further object of the present invention to provide a new and novel energy controller for placement in a building for controlling a plurality of heaters located in separate heating zones or rooms whereby when the temperature in each zone falls below a predetermined value, the heater is activated in the zone for a predetermined time interval wherein only one zone can be activated at a given time.

It is another object of the present invention to provide a new and novel energy demand controller having a plurality of heaters each of which is located in a separate heating zone, a plurality of appliances, and a control responsive to the activation of any one of said heaters for disabling the supply of power to said appliances.

It is another object of the present invention to provide a new and novel energy demand controller wherein a plurality of heaters located in separate heating zones and a plurality of appliances can be controlled so that when any one of the appliances is activated the heaters are disabled.

It is another object of the present invention to provide a new and novel energy demand controller which is capable of controlling a plurality of heaters located in separate heating zones and a plurality of appliances so that when a predetermined number of heating zones require the heaters to be activated on a full time basis the appliances are disabled from consuming electrical power.

It is still another object of the present invention to provide a new and novel method for controlling the use of electrical power by a plurality of heaters and by a plurality of appliances in a residential building wherein each of the heaters is located in a separate zone and wherein the heater in the zone is activated only when the temperature falls below a predetermined temperature so that only one zone can be activated at any given time interval.

SUMMARY OF THE INVENTION

The present invention comprises an energy demand controller that is suitable for residential building construction or retrofitable with existing buildings. The energy demand controller of the present invention includes a central controller for periodically sensing the temperature in each room to ascertain the difference between the desired temperature and the actual temperature and a switch panel which is interconnected with the central controller and with the power source to the heaters in the various zones and to the appliances. The controller is designed to sequentially progress from one zone to the next zone and to inquire as to the status of the temperature difference of each zone. This controller continually cycles until one or more zones experience a first predetermined temperature difference. In that event, the heater in that zone is turned on for a predetermined time interval, usually one second. The controller does not inquire as to the status of the temperature in the next room until the heater in the interrogated room has been on for one second. The heater is then turned off and the controller interrogates the temperature difference for the next room. Under no circumstances during this mode of operation can more than one zone be heated. In the event of severe weather conditions, the temperature existing in a zone may drop beow the predetermined set value by a substantial amount. In that event, when the controller interrogates the temperature difference existing in the room, the heater is turned on full time and the controller proceeds automatically to interrogate the temperature difference of the next room. In this mode of operation, one or more rooms may have heaters on a full-time basis until the temperature difference is brought up to and is within a predetermined acceptable range wherein the one-second cycling of the heater once again commences. In the event of extremely severe weather conditions, a given number of zones may experience such a substantial temperature difference. Optionally, in that event, any appliances currently using electrical power can be deactivated or prevented from operation so that the simultaneous use of the appliances and the heaters do not occur. On a priority basis, if such severe weather conditions occur, or when the house is cold and initially heated, simultaneous power consumption by the heaters and the appliances can be prevented. In the event that the heaters are cycling for one second on and then being turned off, and an appliance is turned on within the house, the appliance can optionally have override control so that any electrical power being delivered to the heaters is prevented while the appliance is being used. Therefore, it is readily observed that simultaneous consumption of electrical power by the electrical heaters and by the appliances is prevented.

The controller of the present inention includes a temperature sensor physically placed in each zone of heating, the necessary logic for comparing the actual temperature with the predetermined or desired level of temperature and the necessary logic for sequentially interrogating the status of the temperature difference existing in each zone. Furthermore, the controller contains the necessary logic for granting priorities to or from energy consumption by the appliances.

The switch panel of the present invention is under control of the controller and is composed of a plurality of solid state switches to provide the necessary electrical power to either the heaters or the appliances in the above-discussed fashion.

Other objects, advantages and capabilities of the present invention will become more apparent as the description proceeds taken in conjunction with the accompanying drawings.

GENERAL DESCRIPTION

Figure 1:
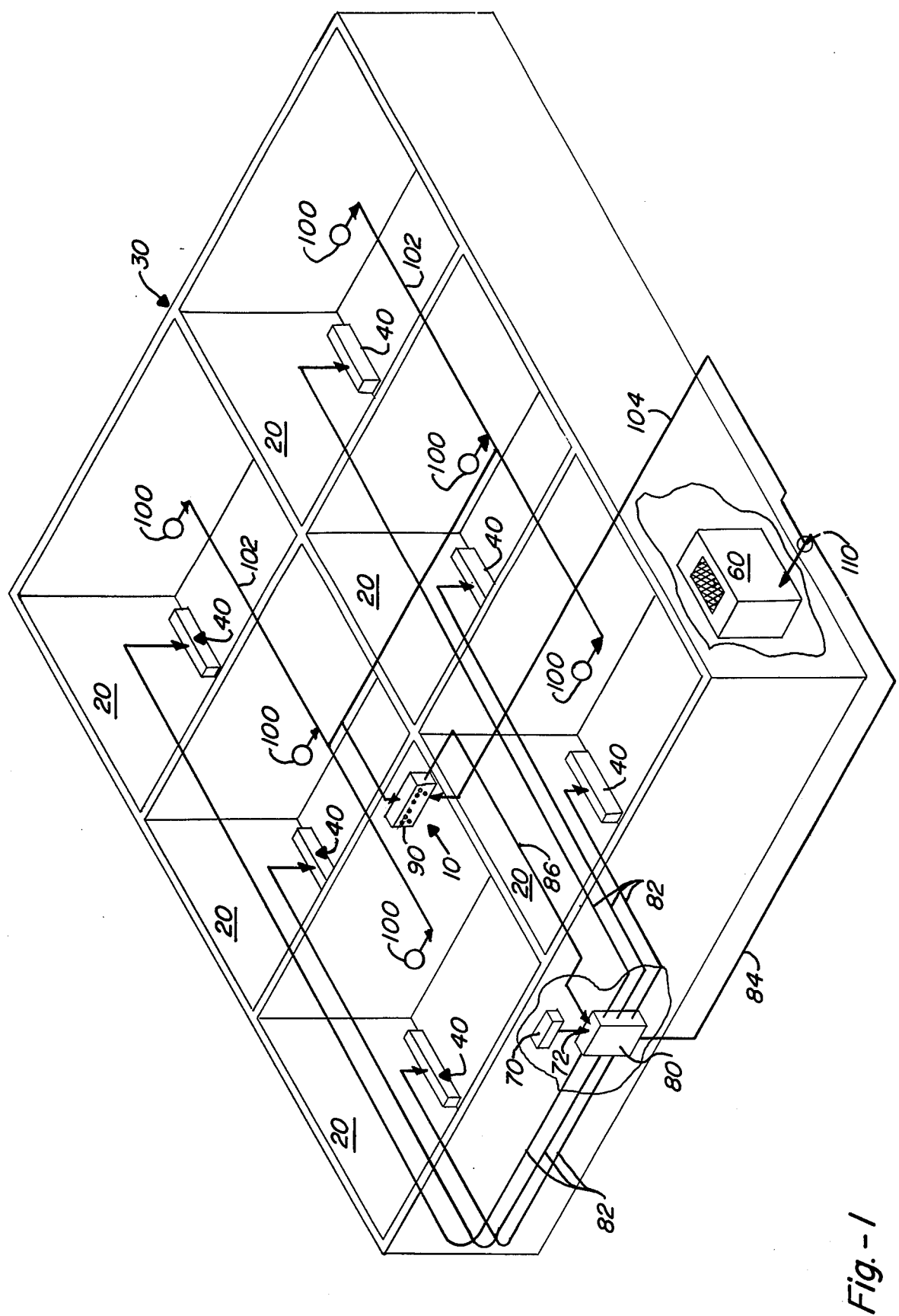
FIG. 1 is an illustration of the energy demand controller of the present invention physically oriented within a mythical building structure.

The energy demand controller 10 of the present invention is shown in FIG. 1 interconnected among six rooms 20 of a mythical house or building 30. For the sake of clarity and convenience, no doors or windows are shown in building 30 and the room 20 arrangement is designed to illustrate the teachings of the present invention and is not designed to be aesthetically or practically pleasing. In fact the rooms 20 may correspond rather to heating zones.

Each room 20 contains a conventional electric heater 40 which may be any of a number of commercially available room electric heaters. In one of the rooms is shown an appliance 60 which may be a stove, refrigerator, hot water heater, deep freezer, or any other conventional and commercially available appliance found within a house or building 30. It is to be expressly understood that although only one appliance 60 is shown and only six rooms with six conventional heaters 40 are shown that the scope of this invention is not to be limited or delimited by such numbers or arrangements. Indeed, residential housing, apartment buildings, and business offices enjoy a nationwide status of non-uniformity in looks and in design.

The energy demand controller 10 of the present invention interconnects with the conventional heaters 40 and the appliance 60 as follows. Power is normally delivered from a conventional fuse box or power source 70 into the switch panel 80 of the present invention. Conventional 110 volt Ac or 220 volt AC, 60 cycle power is delivered from the switch panel 80 of the present invention over interconnecting electrical power lines 82 and is further delivered over power lines 84 into the electrical appliance 60. The switch panel 80 receives control signals over leads 86 from the controller 90 of the present invention. The switch panel 80, therefore, receives control inputs 86 from the controller 90 and based on the status of those inputs delivers electrical power from the fuse box 70 to the heaters 40 and to the appliance 60. It is to be noted, that if the switch panel 80 of the present invention was not used, the power would be delivered directly from the fuse box 70 over power lines 82 and 84 directly into the heaters 40 and the appliance 60.

Also disposed in each room 20 is a temperature sensor 100. Temperature sensor 100 is a conventional temperature sensor and may comprise any of a number of commerically available temperature sensors. The outputs of the temperature sensors 100 are individually delivered over a bus (i.e. a grouping of electrical wires) 102. Each temperature sensor 100 measures the temperature of it's particular room in which it is placed. The temperature sensor 100 can be physically oriented in the room in any of a number of suitable approaches.

The controller 90 of the present invention receives inputs from each sensor 100 over bus 102. In the embodiment shown in FIG. 1, 6 wires are inputted into the energy controller 90 (one wire from each sensor). The energy controller 90 also receives an input over bus 104 which is interconnected with a conventional current sensing element 110. The current sensing element 110 is positioned in close proximity with the power delivery to the appliance 60. Whenever the appliance 60 is turned on, it draws electrical power from power line 84 and the sensor 110 is conventional and responds to the flow of current or power into the appliance 60 from the power line 84 in a conventional manner. The output of the current sensor 110 is an electrical signal which is delivered over bus 104 as an input to the energy controller 90.

Figure 2:
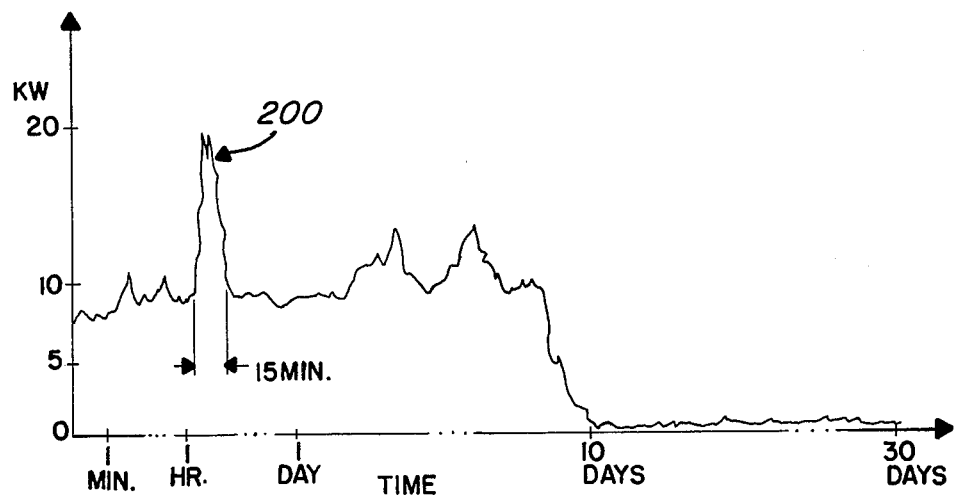
FIG. 2 is a graphical illustration of the energy consumption under the demand rate of billing for the mythical building of FIG. 1.

The operation of the energy demand controller 10 of the present invention will now be discussed. The energy demand controller is designed to limit high electrical demand due to the simultaneous use of electrical power and to produce a more stable, uniform heat throughout the entire house or building. Power companies are increasingly adopting demand billing for residential and living use. As previously discussed, demand billing is significantly different than rate billing that has been frequently used throughout the country. In rate billing, the total energy actually used by the client is billed. In demand billing, however, as shown in FIG. 2, the rate is determined by the highest amount of energy demanded during a given time interval by the user. The demand interval may be typically fifteen minutes. For example, in FIG. 2, the energy curve is that shown for the mythical residential dwelling of FIG. 1 over a thirty day or one month interval. At peak 200, a fifteen minute interval obtains the 20 kilowatt value. At this time, the residential inhabitants turned on almost all of their electrical appliances, light, and heaters. On a tenth day the inhabitants left the house for a vacation so that the electrical consumption in the house for the remaining part of the month is at a minimum level. The total energy utilized by the inhabitants would be the number of kilowatt hours actually used, which in this case, for the remaining 20 days would be at a very minimum rate. The demand billing, however, would take the highest fifteen minute interval of electrical demand during the month which occurred at peak 200, and that highest demand peak would set the billing charge for the month even though the inhabitants of the building left on vacation. It is highly desirable, therefore, to privide a system such as the present invention, to limit high electrical demand by controlling those appliances and heaters which utilize the highest electrical power consumption.

Figure 3:
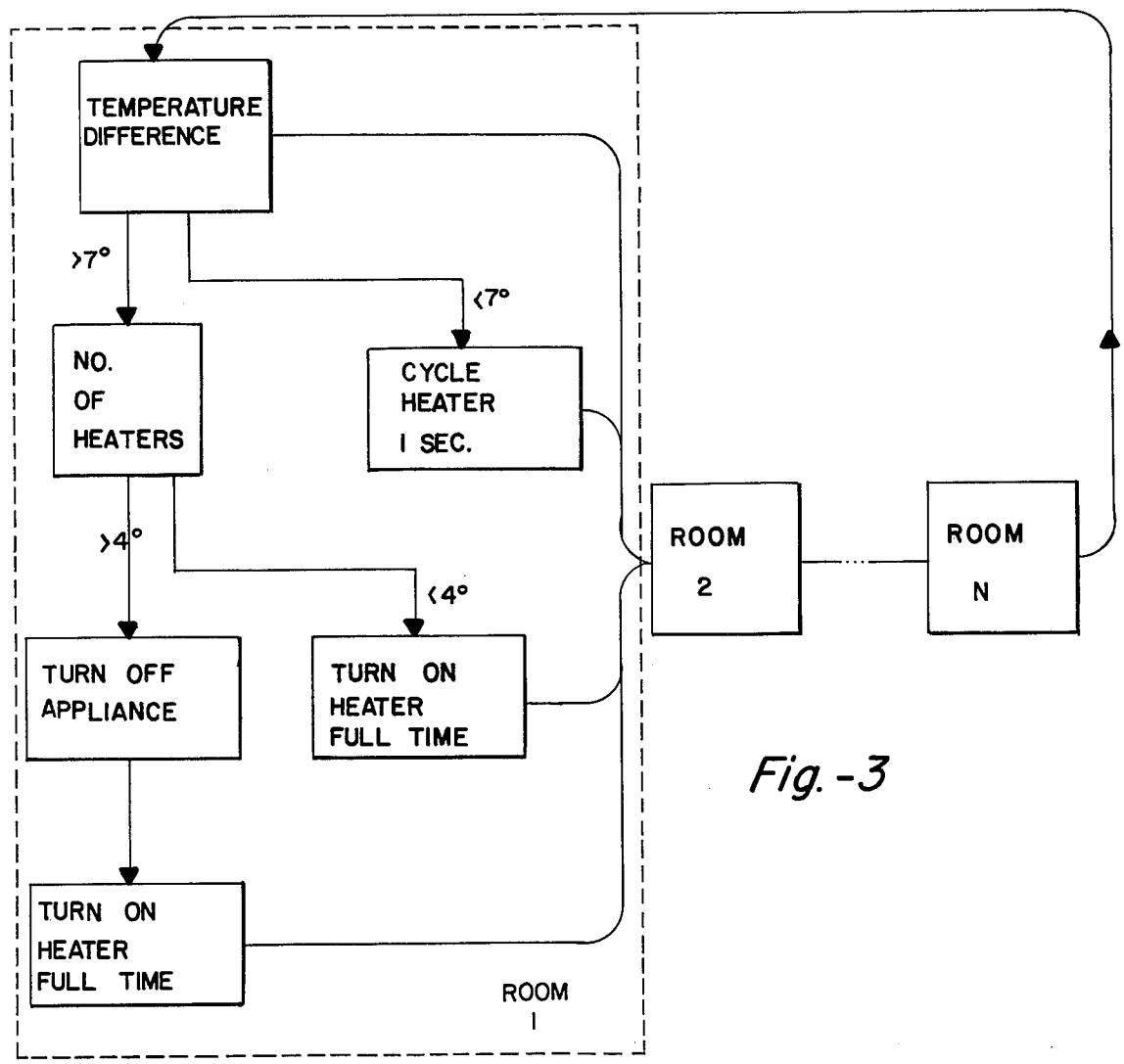
FIG. 3 is a logical flow chart of the various sequence of events occurring for the energy demand controller of the present invention.

The following method is performed by the energy demand controller 10 of the present invention as flow charted in FIG. 3. The difference in the room temperature from a predetermined value is first determined. If the temperature of the room is at the desired level, then the difference in temperature between the desired temperature and the actual temperature is zero. The energy demand controller 10 of the present invention after determining the difference in the temperatures to be zero, immediately interrogates the temperature difference in the second room and if the temperature is also zero, the energy demand controller 10 interrogates the temperature in the third room and continues to do so until the temperature in all the rooms are sequentially ascertained, at which time it comes back to the first room to interrogate that room's temperature. Therefore, when a building is fully heated to the desired temperature level, the energy demand controller 10 of the present invention merely continually interrogates the temperature in each of the rooms.

In the event that the temperature difference in room one is between zero and seven degrees, the controller 90 causes the heater 40 in room one to turn on for one second. At the end of the one second interval, the controller 90 interrogates the temperature difference in room two and if that difference is also between zero and seven degrees, then the heater 40 in room two is activated for one second. Assume the temperature difference in all six of the rooms of the preferred embodiment is between zero and seven degrees. In that case, each of the heaters 40 would be turned on for one second in a sequential fashion-one after the other. The heater in room one would turn on for one second, when it turned off, the heater in room two would turn on. When the heater in room two turned off, the heater in room three would turn on, etc. None of the heaters during this mode of operation can be on simultaneous with any other heater. Clearly this mode of operation is novel over conventional approaches if heat were conventionally turned on in a cold house, all six heaters would be turned on, thus causing a demand peak 200 as shown in FIG. 2. However, if the heat were turned on in a cold house using the energy demand controller 10 of the present invention, only one sixth the height of the peak would be obtained since no heater can be on with any other heater. This mode of operation is true only if the temperature difference between actual room temperature and desired room temperature is between zero and seven degrees.

If the temperature difference in room one is greater than seven degrees, then the heater in room one will be turned on on a full-time basis. Therefore, assume that rooms one and two have a temperature difference greater than seven degrees but the remaining rooms do not. As the energy controller 90 of the present invention interrogates the temperature in each room in a sequential fashion, if it discovers the temperature difference in room one to be greater than seven degrees, it will turn that heater on full time rather than for only one second and proceed to interrogate the temperature in room two. The controller 90 also finds the temperature difference in room two to be greater than seven degrees and also turns that heater on full time. Upon proceeding to interrogate the temperature in rooms three and four, the temperature difference is found to be greater than zero and less than seven degrees and the controller 90 turns those heaters on only for one second each. If the temperature difference in rooms five and six is zero, it interrogates the temperature difference and skips (i.e., in less time than a second) to the next room, which would be, of course, back to room one. Therefore, it is apparent that the controller 90 can turn the heater on full time if the temperature difference in that room or zone is greater than seven degrees.

Optionally, if more than four rooms have a temperature difference of greater than seven degrees, then the energy controller can be selected to turn the appliance 60, if on, off. In this mode, all six room heaters could be turned on full time but any appliance is prevented from being used until the room temperature approaches within two degrees of the desired temperature. Furthermore, the controller 90 may be optionally selected to give override priority to the appliances 60 rather than the heaters 40. If this option is selected, whenever an appliance is activated and the temperature of the room within the desired range, of seven degrees then the heaters 40 are turned off or prevented from turning on. Under normal building use if this option is selected the actual room temperature will be within seven degrees of the desired level. In that mode of operation, the rooms are brought up to temperature by cycling the heaters on at one-second intervals in each room. During this mode of operation, however, should the inhabitant of the building desire to use an appliance, then that use of the appliance will cause the controller 90 to prevent heating of the rooms even on the cycling one-second basis. For thoroughly insulated houses, the typical use of a hot water heater, dryer or the like is 20-30 minutes and the heat loss from the house, during that time is one to two degrees.

It can be readily observed, that energy demand controller 10 of the present invention prevents the simultaneous use of high energy consumers such as heaters and appliances. Therefore, the energy demand controller 10 shown in FIG. 1 determines the temperature in each room or zone from sensors 100, receives that information over bus 102, and compares that information to a predetermined set temperature value at the controller 90 to determine the temperature difference. If the temperature difference is greater than zero, then appropriate command signals appear on lead 86 which control the switch panel 80. For example, assume that the heater 40 in room one is to be turned on for one second. A one-second control pulse appears on lead 86 to the switch panel 80 which activates a switch connecting the power line 72 from the fuse box 70 to power line 82 going to the heater 40 in room one. At the end of the one-second interval, the switch is released and no power is delivered to the heater 40. In the event an appliance 60 is turned on while the heaters 40 are being sequentially activated or being activated on a full-time basis, the sensor 110 determines the appliance's use and relays that information over bus 104 into the energy controller 90. The energy controller 90 sends appropriate control signals to the switch panel 80 to turn off all heaters 40 so that electrical power appearing on leads 72 cannot be delivered to heaters 40. In this mode of operation, the only electrical power being delivered is over power line 84 to the appliance 60.

DETAILED DESCRIPTION

Figure 4:
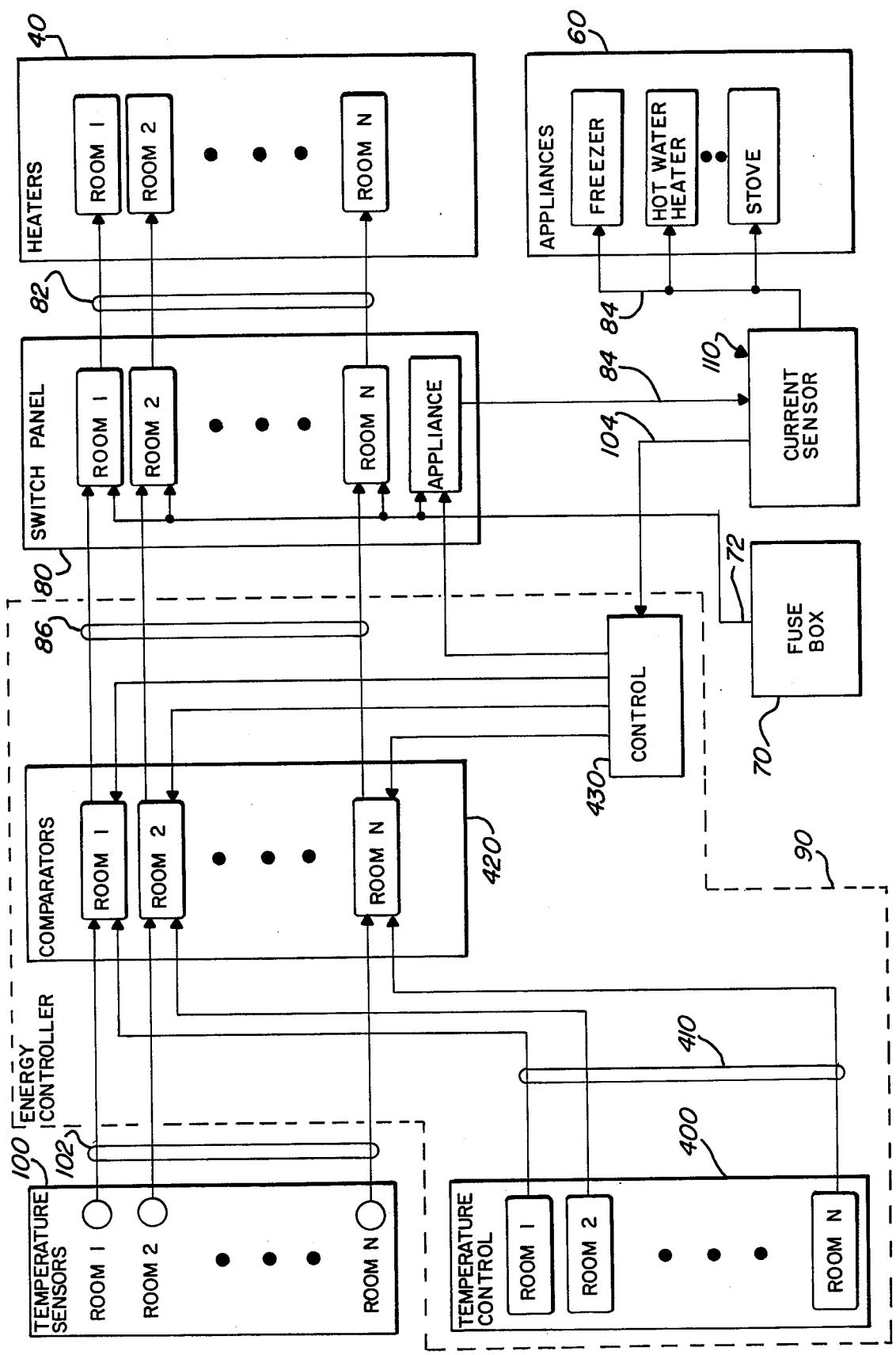
FIG. 4 is a diagrammatic illustration of the various components of the energy demand controller of the present invention.

In FIG. 4 is shown the various components of the energy demand controller 10 of the present invention. The temperature sensors 100 are interconnected over bus 102 with the controller 90 which in turn is interconnected with the switch panel 80 over bus 86. Power from the fuse box 70 is delivered over power line 72 through the switch panel 80 to power lines 82 and thence to the heaters 40. Power is also delivered from the switch panel 80 over power line 84 through current sensor 110 and thence to the appliances 60. Whether or not power is delivered to the heaters 40 or to the appliances 60 is dependent upon the state of the switches found within the switch panel 80.

The controller 90 is further shown in FIG. 4 to include the temperature control 400 interconnected over bus 410 with a group of comparators 420. The temperature controls 400 are located on the panel of the controller 90 and are used to set the predetermined value of temperature for each room. It is to be expressly understood that this compares to zone heating in which at predetermined locations, zones of heat can be preset. The term "room" is expressly understood in zone heating. Each temperature control 400 can comprise any of a number of conventional rheostatlike devices or any other conventional devices that may be used to set temperature. The value of each predetermined temperature for each room or zone is delivered over bus 410 into a set of comparators 420.

The comparators 420 compare inputs received from the temperature sensors 100 over bus 102 with the predetermined temperature set from the temperature control 400. One temperature sensor exists for each room or zone and, likewise, one comparator exists in the group of comparators 420. Any number of rooms or zones may be utilized under the teachings of the present invention. Control circuit 430 is used to interrogate each room or zone in a sequential fashion. Control circuit 430, as will be subsequently discussed, interrogates the comparator for room one, room two, etc. until the last room is interrogated. The comparators 420 generally determine the temperature difference between the desired temperature set by the control 400 and the actual temperature of the room or zone as detected by the sensor 100. As discussed in the General Description above, if those differences are in one of three modes, that is (1) at 0°, (2) less than seven degrees, and (3) greater than 7°, then the heaters 40 and the appliances 60 will be selectively activated or deactivated. The control signals to activate the switches controlling the power flow to the heaters 40 and the appliances 60 eminate from the comprators 420 on bus 86. The teachings of this invention are not to be limited to the preferred heaters and appliances but embrace any first group of electrical users and any second group of electrical users wherein control of electrical consumption is desired.

As shown in FIG. 4, much of the circuit is replicate and, therefore, the following detailed dicussion will limit itself as much as possible to that circuitry for one room. It is to be expressly understood that the same and identical circuitry exists for the remaining rooms or zones.

Figure 5:
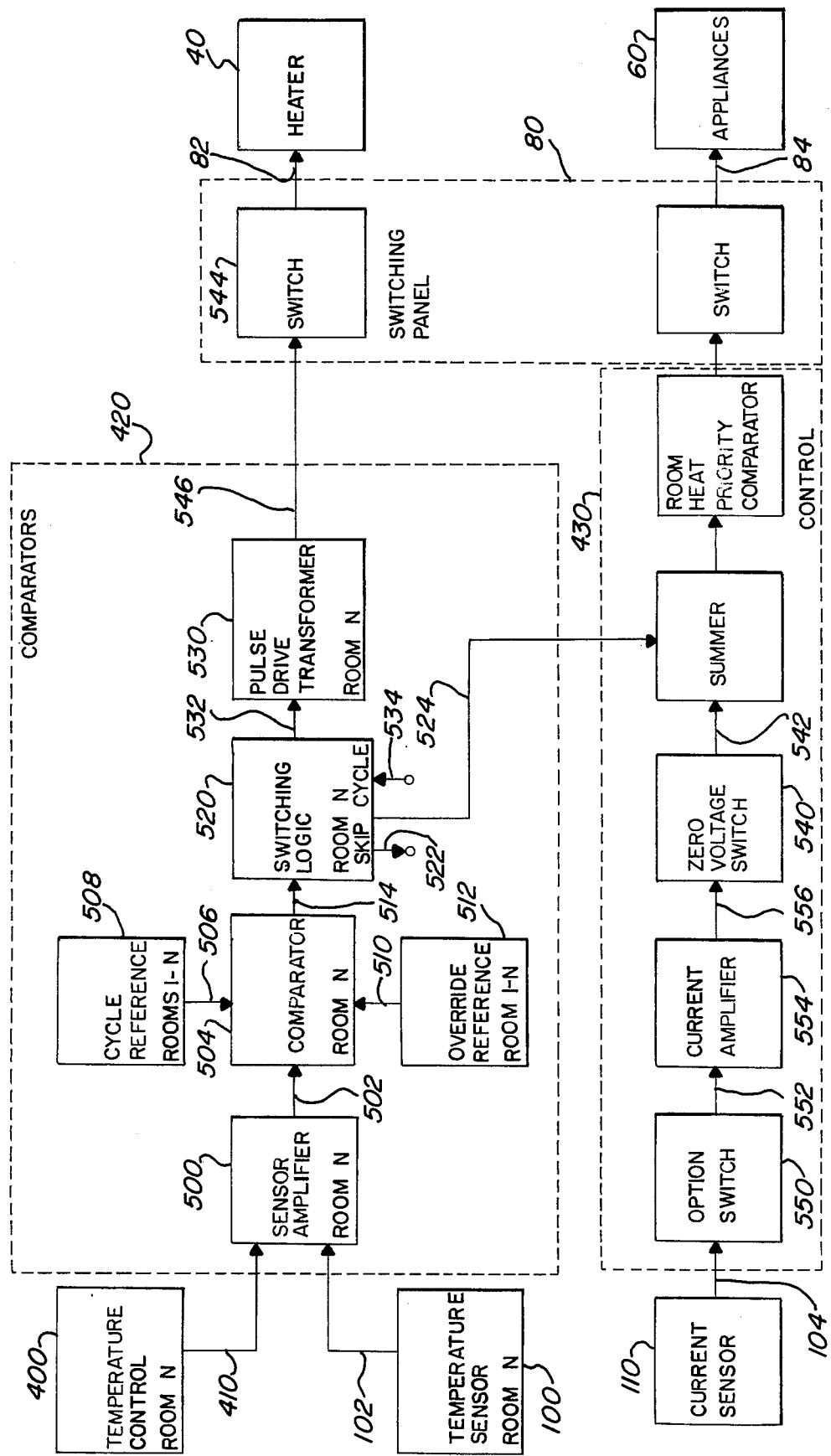
FIG. 5 is a block diagrammatic representation of the electronic circuitry necessary for one room or zone of the energy demand controller of the present invention.

In FIG. 5, more detailed elements of the comparators 420 and the control circuit 430 are shown. The temperature control 400 accesses the comparator 420 in the sensor amplifier 500. The sensor amplifier 500 also receives an input from the temperature sensor 100 over lead 102. The function of the sensor amplifier 500 as will be discussed in more detail is to deliver a difference voltage on lead 502 which is proportional to the difference in temperature between the temperature control 400 which is set at a predetermined value and the actual temperature of the room as detected by temperature sensor 100. The difference voltage on lead 502 is delivered into a comparator circuit 504. The comparator circuit 504 actually comprises two separate comparators which compare the difference voltage appearing on lead 502 in the first instance to a reference voltage appearing on lead 506 from a cycle reference circuit 508. In the second instance, the difference voltage appearing on lead 502 is compared to an override reference voltage appearing on lead 510 from an override reference circuit 512. The results of these comparisons are then generated from the comparator circuit 504 over lead 514 into a switching logic circuit 520. Each room comparator has a sensor amplifier 500, a comparator 504, and a switching logic circuit 520. However, the cycle reference circuit 508 and the override circuit 512 are common to all room comparators. Leads 506 and 510, therefore, access the corresponding comparator circuits 504 for the remaining rooms.

In operation, the comparator 420 functions as follows. The predetermined temperature in the room is set at the temperature control 400. This results in a set voltage appearing on lead 410 accessing the sensor amplifier 500. Likewise, the temperature sensor 100 generates the voltage proportional to the actual room temperature on lead 102. The sensor amplifier 500 senses the difference between the two voltages and delivers that difference as a voltage signal on lead 502. As will be recalled from the prior discussion, if the difference in the two voltages is zero, then the controller 90 is in a first mode. If, however, the voltage signal appearing on lead 502 is proportional to a temperature difference of less than seven degrees, then a second mode of operation commences. The cycle reference circuit 508 provides a reference voltage on lead 506 which is compared to the voltage signal on lead 502 for those operations when seven degrees difference or less in temperature occurring is found. The override reference circuit 512 provides a reference voltage appearing on lead 510 which is compared to the difference voltage appearing on lead 502 to result in the third mode of operation. Suffice it to say, that if neither the second or third modes are selected, then the first mode is selected (i.e., a temperature difference of zero degrees) and a logic command is issued on the skip lead 522. On the other hand, if the difference in temperature is less than seven degrees, a signal is issued on lead 524 to activate the pulse drive transformer 530 which causes the pulse drive transformer to turn the heater on for one second. Finally, if the third mode is selected, then a signal is issued on lead 532 as well as a constant signal on lead 524 to continually turn the heater 40 on. The switching logic only becomes activated when a cycle command appears on lead 534. At all other times, the comparator 420 is in the inoperative or inactive state.

Figure 6:
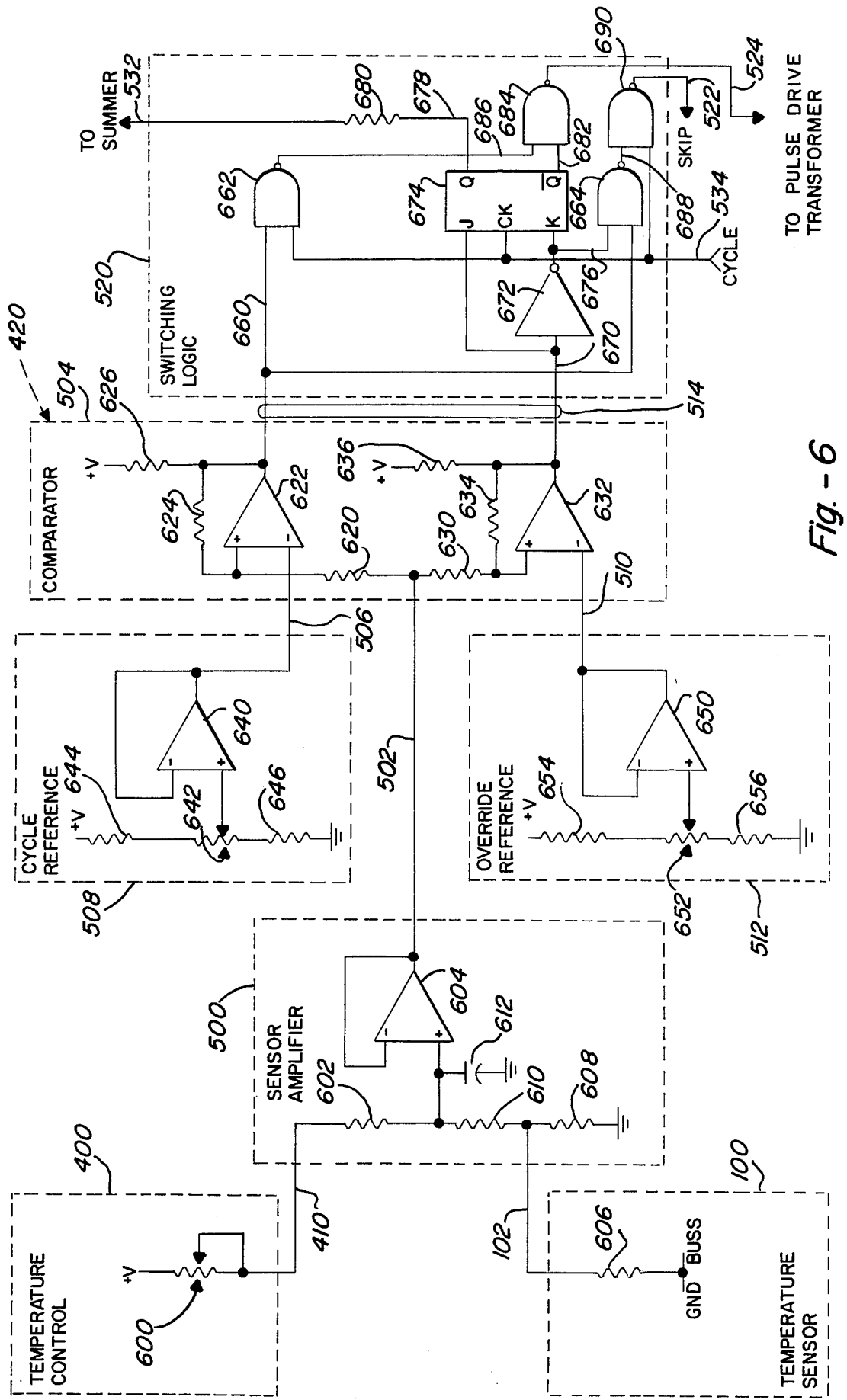
FIG. 6 is the electronic detailed description of one preferred embodiment of a portion of the controller of the present invention.

The details of one preferred embodiment of the electronic circuitry is shown in FIG. 6 for the temperature control 400, the temperature sensor 100 and the comparator 420. The temperature control 400 comprises a rheostat 600 biased to positive voltage at one end and interconnected at its other end to lead 410 which is connected in series to resistor 602 to the PLUS input of operational amplifier 604.

Operational amplifier 604 is conventional and of the type commercially available as LM324N manufactured by National Semiconductor. The temperature sensor 100 comprises a thermistor 606 which is interconnected to ground at one end and the other end at which is connected to lead 102 which is delivered through resistor 608 to ground and is further delivered through resistor 610 to the PLUS input of operational amplifier 604. The PLUS input is further grounded through capacitor 612. The output of the operational amplifier 604 is delivered back to the MINUS input and is further delivered over lead 502 to the comparator circuit 504. Lead 502 inputs to a series resistor 620 which is further interconnected with the PLUS input of operational amplifier 622. Resistor 620 is further delivered through resistor 624 and resistor 626 to positive voltage. Resistor 624 is connected to the output of the operational amplifier 622. Lead 502 is further connected in series with resistor 630 to the PLUS input of operational amplifier 632. Operational amplifiers 622 and 632 are conventional and of the type commercially available as LM339N manufactured by National Semiconductor. The output of operational amplifier 632 is connected back to the PLUS input through resistor 634 and is further connected through resistor 636 to positive voltage. The MINUS input to operational amplifier 622 is delivered over lead 506 from the operational amplifier 640 found within the cycle reference circuit 508. Operational amplifier 640 is conventional and of the type commercially available as LM324N manufactured by National Semiconductor. The PLUS input to operational amplifier 640 is delivered from the tap of a potentiometer 642 which has one end biased through a series connected resistor 644 to positive voltage and the other end connected through a series resistor 646 to ground. The output of operational amplifier 640 is further connected back to the MINUS input. The MINUS input to comparator 632 is received over lead 510 from the override reference circuit 512 from operational amplifier 650. The PLUS input to operational amplifier 650 is connected to the tap of a potentiometer 652 which is biased through a series resistor 654 to positive voltage at one end and is connected in series with resistor 656 to ground at the other end. The output of operational amplifier 650 is further connected back to the MINUS input. The output of operational amplifier 622 is delivered over lead 660 into NAND-gate 662 of the switching logic circuit 520. The other input to NAND-gate 662 is delivered over lead 534 from the cycle input. Furthermore, lead 660 is delivered into one input of NAND-gate 664. The output of comparator 632 is delivered over lead 670 into an inverter 672 and further delivered to the J input of JK flip-flop 674. The output of the inverter is delivered over lead 676 to the remaining input of NAND-gate 664 and to the K input of the JK flip-flop 674. The clock input CK to the JK flip-flop is received over lead 534 from the cycle input. The Q output of the JK flip-flop 674 is delivered over lead 678 through a series resistor 680 to lead 532. The $\overline{Q}$ output of the JK flip-flop is delivered over lead 682 to one input of NAND-gate 684, the other input of which is received over lead 686 from the output of NAND-gate 662. The output of NAND-gate 684 is delivered over lead 524 to the pulse drive transformer 530. The output of NAND-gate 664 is delivered over lead 688 to one input of NAND-gate 690. The other input of NAND-gate 690 is received from lead 534 from the cycle input. The output of gate 690 is delivered over lead 522 to the skip output.

The following component values are preferred:
Potentiometer 600 — 1 Kohm
Resistor 602 — 3.92 Kohm
Resistor 610 — 2.56 Kohm
Resistor 608 — 3.48 Kohm
Capacitor 612 — 0.1 uF
Resistor 644 — 5.23 Kohm
Potentiometer 642 — 500 ohm
Resistor 646 — 5.23 Kohm
Resistor 654 — 5.23 Kohm
Potentiometer 652 — 500 ohm
Resistor 656 — 5.23 Kohm
Resistor 620 — 1.5 Kohm
Resistor 624 — 390 Kohm
Resistor 630 — 3.3 Kohm
Resistor 634 — 470 Kohm The operation of the circuitry in FIG. 6 will now be discussed. A temperature reference voltage is developed on lead 410 and is compared to the voltage appearing on lead 102 which is proportional to the actual room temperature. The difference between the two voltage levels is delivered to the PLUS input of the operational amplifier 604. The amplifier 604 has a gain of one and serves as an isolation or buffer amplifier. The difference voltage now appears on lead 502 and inputs into the comparator 504. In a similar manner, a first cycle reference voltage is developed on lead 506 which is variable by adjusting potentiometer 642 and a second override reference voltage appears on lead 510 which is also variable to potentiometer 652. As previously mentioned, the cycle reference voltage appearing on lead 506 is indicative of temperature differences less than seven degrees and comparator 622 compares the voltage on lead 502 with the reference voltage 506 and generates a high output on lead 660 if the reference voltage is within this range. If the temperature difference is greater than seven degrees, comparator 632 also issues an output of high on lead 670. Therefore, when the temperature difference is greater than seven degrees both outputs 660 and 670 of bus 514 are high. In the event that the temperature difference is less than seven degrees, only the 660 lead has a high output and lead 670 is low. In the event that there is no temperature difference, then both leads 660 and 670 have a low circuit.

When the temperature difference is zero, the low appearing on lead 660 is delivered into NAND-gate 664 which results in a high on its output lead 688. Whenever the circuitry for this room's temperature control is interrogated, a high appears on lead 534. The high on lead 534 and the high on lead 688 cause the output of NAND-gate 690 to go low indicating that the controller, in a manner to be discussed, should skip to the next room and interrogate that room's temperature difference status. Therefore, if the temperature difference between the temperature control and the actual temperature of the room is zero, then a skip signal will appear immediately on 522 enabling the controller to interrogate the next room's temperature status.

In the event that the temperature difference is between zero and seven degrees, a high appears on lead 660 and a low appears on lead 670. In this mode, when the cycle input on lead 534 goes high, the combination of two high inputs to NAND-gate 662 results in a low output forcing the output of NAND-gate 684 to go high which is delivered over lead 524 to the pulse transformer to turn the heater on. Since the cycle pulse appearing on lead 534 appears for a one-second duration, the high signal on lead 524 to the pulse drive transformer also appears high for one second. This controls the switch to the heater 40 enabling the heater to turn on for one second.

In the event that the temperature difference is greater than seven degrees, the output on lead 660 and 670 are both high. In that mode, when a high appears on the cycle lead 534, the output of NAND-gate 662 goes low forcing the output of NAND-gate 684 to go high thereby maintaining pulse driver transformer on. Furthermore, the high on lead 670 is delivered to the J input of the JK flip-flop 674 and when a high appears on lead 534, Q becomes high which is delivered over lead 678 to the summer on lead 532. The $\overline{Q}$ output of the JK flip-flop 674 becomes low and that low also forces the output of NAND-gate 684 to go high. The JK flip-flop remains in this state until the temperature of the room obtains two or three degrees difference from the desired temperature. The turn on and turn off voltage of the operational amplifier is due to hysteresis and hence the amplifier turns on at 7° and off at 2°.

Referring back to FIG. 5, it is now seen how the pulse transformer 530 can be activated under control of the switching logic 520. The pulse transformer 530, however, is also under control of the zero voltage switch 540 in a manner which will now be described. Under normal operating conditions, when the appliance is not being used, the zero voltage switch 540 will issue a signal on lead 542 enabling the pulse drive transformer 530 to activate the switch 544 over lead 546. Therefore, when the activation pulse appears on lead 524 from the switching logic 520, the pulse drive transformer 530 becomes activated to activate the switch 544 turning on the heater 40. If, however, the appliance is being used, then current sensor 110 detects such use of the appliance and delivers an indication over lead 104 into an option switch 550. If the user of an energy demand controller 10 of the present invention has selected this option, then the activation signal appearing on lead 104 is extended through to lead 552 to enter a current amplifier 554. The signal appearing on lead 104 is now amplified into a control signal appearing on lead 556 which enters the zero voltage switch 540. Upon the appearance of the control signal on lead 556, the zero voltage switch delivers an output signal on lead 542 which prevents the pulse drive transformer from operating. Therefore, even though heating request signals appear on lead 524 to the pulse drive transformer 530, the heater 40 remains inoperative during the time that the appliance is being used. Of course, this is provided only if the user of the energy controller has optionally switched in the current sensor 110 at the option switch 550. If not, then both the heaters and the appliance may be in simultaneous operation.

Figure 7:
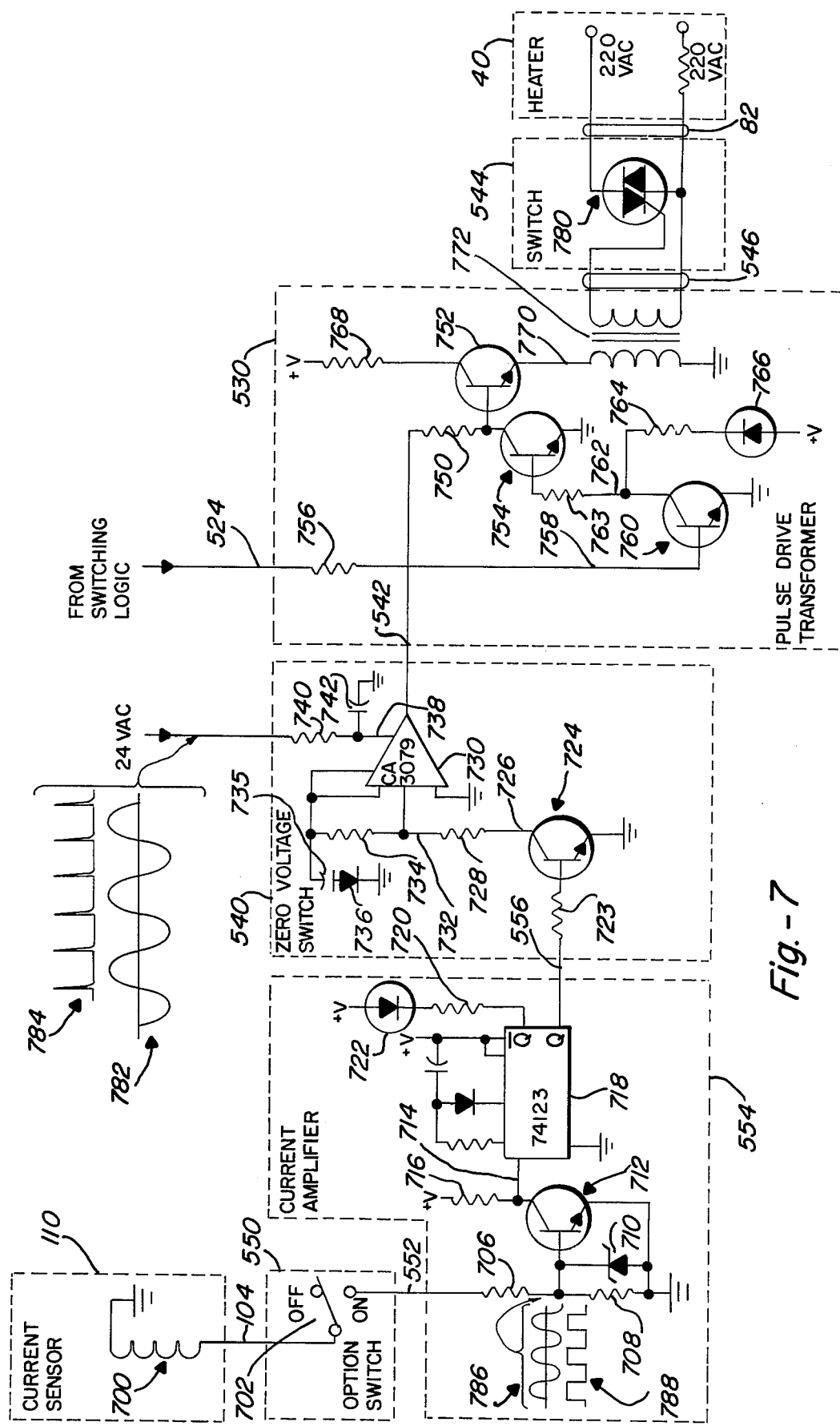
FIG. 7 is a detailed electronic schematic of the remaining portion of the energy controller of the present invention.

One preferred electronic embodiment of the current amplifier 554 and the zero voltage switch 540 is shown in FIG. 7. The current sensor 110 is a conventional current coil sensing device 700 having one end grounded and the other end delivered over lead 104 to the on-off switch 702. When the on-off switch 702 is in the OFF position, no signals are extended and when in the ON position, the signals are extended to lead 704. Lead 704 accesses the current amplifier 554 at series resistor 706 which in turn is connected through a series resistor 708 to ground. The node between resistors 706 and 708 is delivered to the base of a transistor 712. Also interconnected to the base of transistor 712 is a zener diode 710 which is interconnected with ground in parallel with resistor 708. The emitter of transistor 712 is also interconnected with ground. The collector is connected over lead 714 in series with resistor 716 to a positive voltage. Lead 714 is also interconnected with an integrated circuit chip DM74123 manufactured by National Semiconductor. The integrated circuit DM74123 is conventionally interconnected as shown. The output of integrated circuit chip 718 is delivered from Q over lead 556 into the zero voltage switch 540. The $\overline{Q}$ output of chip 718 is delivered through a series resistor 720 through a light emitting diode 722 to positive voltage. Lead 556 accesses a series connected resistor 723 which enters the base of the transistor 724. The emitter of transistor 724 is grounded while the collector is delivered over lead 726 through resistor 728 and into a conventional chip 730 commercially available from RCA as CA3079 over lead 732. Lead 732 is further connected in series with resistor 734 through a diode 736 to ground. The node between resistor 734 and diode 736 is also interconnected with chip 730 in a conventional fashion. The chip 730 is also interconnected over lead 738 through resistor 740 to a 24 volt AC source. The chip 730 is also connected over lead 738 to a capacitor 742 to ground. The output of the chip 730 is delivered over lead 542 into the pulse drive transofrmer 530. Lead 542 specifically accesses a resistor 750 which is interconnected to the base of transistor 752 and further to the collector of transistor 754. Lead 524 from the switching logic 520 accesses resistor 756 and is delivered over lead 758 to the base of transistor 760. The emitter of transistor 760 is grounded while the collector is delivered over lead 762 through a resistor 764 and light emitting diode 766 to positive voltage. Lead 762 is also delivered through resistor 763 into the base of transistor 754. The emitter of transistor 754 is grounded and the collector of transistor 754 is further delivered into the base of transistor 752. The collector of transistor 752 is connected through resistor 768 to positive voltage while the emitter is delivered over lead 770 to one side of the pulse transformer 772. The output of pulse transformer 772 is delivered over leads 542 to a solid state switch 780. The solid state switch 780 is also interconnected over lead 82 with the heater 40.

The following are typical values for the components shown:

Resistor 706 — 10 Kohms
Resistor 708 — 1 Kohm
Resistor 716 — 1 Kohm
Resistor 722 — 390 Kohms
Resistor 722 — 1 Kohm
Resistor 728 — 3.3 Kohms
Resistor 734 — 10 Kohms
Capacitor 735 — 250 mF
Resistor 740 — 2 Kohms
Capacitor 742 — 0.1 mF
Resistor 750 — 1 Kohm
Resistor 756 — 10 Kohms
Resistor 764 — 270 ohms
Resistor 768 — 22 ohms
Resistor 763 — 10 Kohms The operation of the circuitry in FIG. 7 will now be described. In the event that the option switch 550 is in the OFF position, or if in the ON position, and the current sensor 110 is not sensing any current (i.e., the appliance is not being used), then the zero voltage switch 540 functions in a conventional fashion. Chip 730 receives a 24 volt AC signal at input 738 as represented by waveform 782. The output of chip 730 is delivered on lead 542 and is comprised of a series of pulses as shown by waveform 784. These spike-like pulses are conveyed through to the solid state switch 780 thereby turning the switch 780 to the ON position if the signal appearing on lead 524 is high. This turns on transistor 760 which in turn turns transistor 754 on which in turn permits the spike pulses to be transmitted through transistor 752 to the pulse transformer 772. In this mode of operation, the light emitting diode 766 also becomes activated indicating that the heater is turned on. In the event that the user of the energy demand controller 10 of the present invention has switched the option switch to the ON position, and has activated the appliance, then current flow will be detected by current sensor coil 700 and that detection is delivered into the base of transistor 712 as a sinusoidal wave input as shown by graph 786. The output of transistor 712 is a square wave pulse shown by waves 788. The IC chip 718 produces a low output on lead 556 as long as the square wave pulse train 788 is delivered into the chip 718 over lead 714. Therefore, as long as current is sensed in the appliance, the ensuing square wave train of pulses 788 appearing on lead 714 causes the IC chip 718 to produce a low signal on lead 556 thereby activating light emitting diode 722 informing the operator that the appliance is on. Furthermore, the high signal on lead 556 turns the transistor 724 on and causes the chip 730 to turn off thereby causing a low indication on lead 542. In this mode of operation, whenever the appliance is being used, no switching pulses are extended into the solid state switch 780 thereby preventing the heater from turning on.

Figure 8:
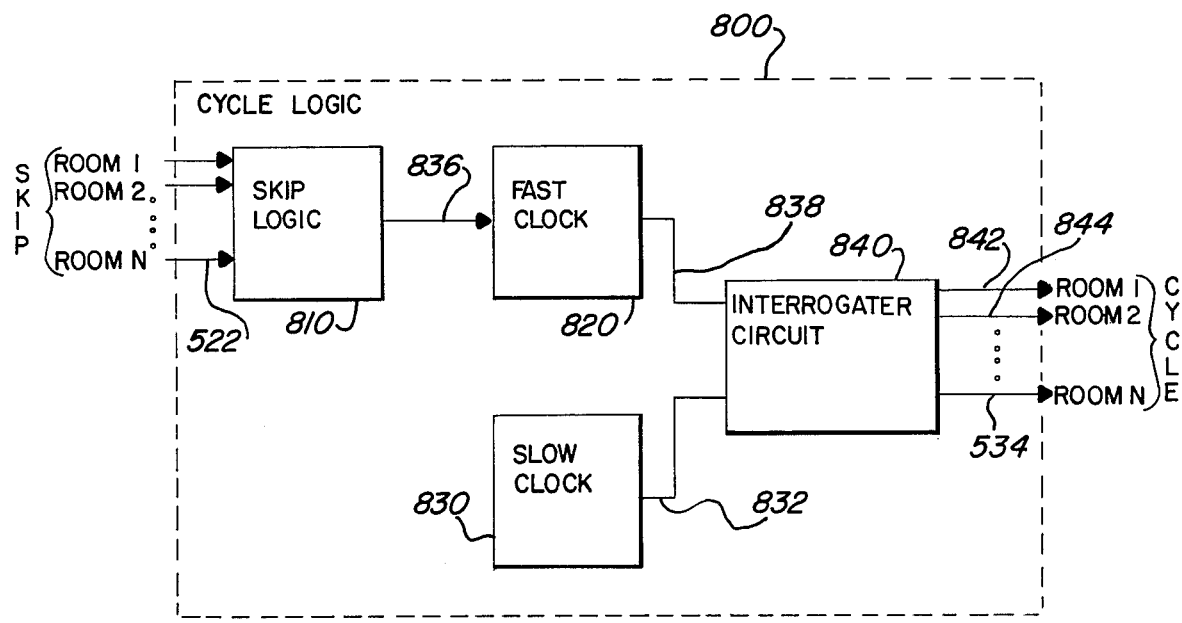
FIG. 8 is a diagrammatic representation of the timing necessary for the controller of the present invention.

The remaining control circuitry of the present invention will now be described. In FIG. 8 is shown the cycle logic 800 which includes a skip logic circuit 810, a fast clock circuit 820, a slow clock circuit 830, and an interrogate circuit 840. The skip logic circuit 810 receives various inputs from the rooms which for room $n$ is accessed over lead 522. The various outputs also go to the different rooms which for room $n$ is lead 534. In operation, the cycle logic 800 normally produces a train of sequential pulses appearing on leads 842, 844, and then finally to the last lead for room $n$ which is lead 534. This train of sequential cycle pulses is delivered from the slow clock over lead 832. In the event, that a skip signal is issued, then the skip logic 810 activates a fast clock 820 over lead 836 causing the fast clock 820 to override the slow clock 830 over lead 838. In operation, therefore, a sequential stream of pulses is issued on output leads 842, 844, and 534. However, whenever the interrogated rooms responds with a skip pulse, then the fast clock is activated to immediately skip the interrogation to the next room.

Figure 10:
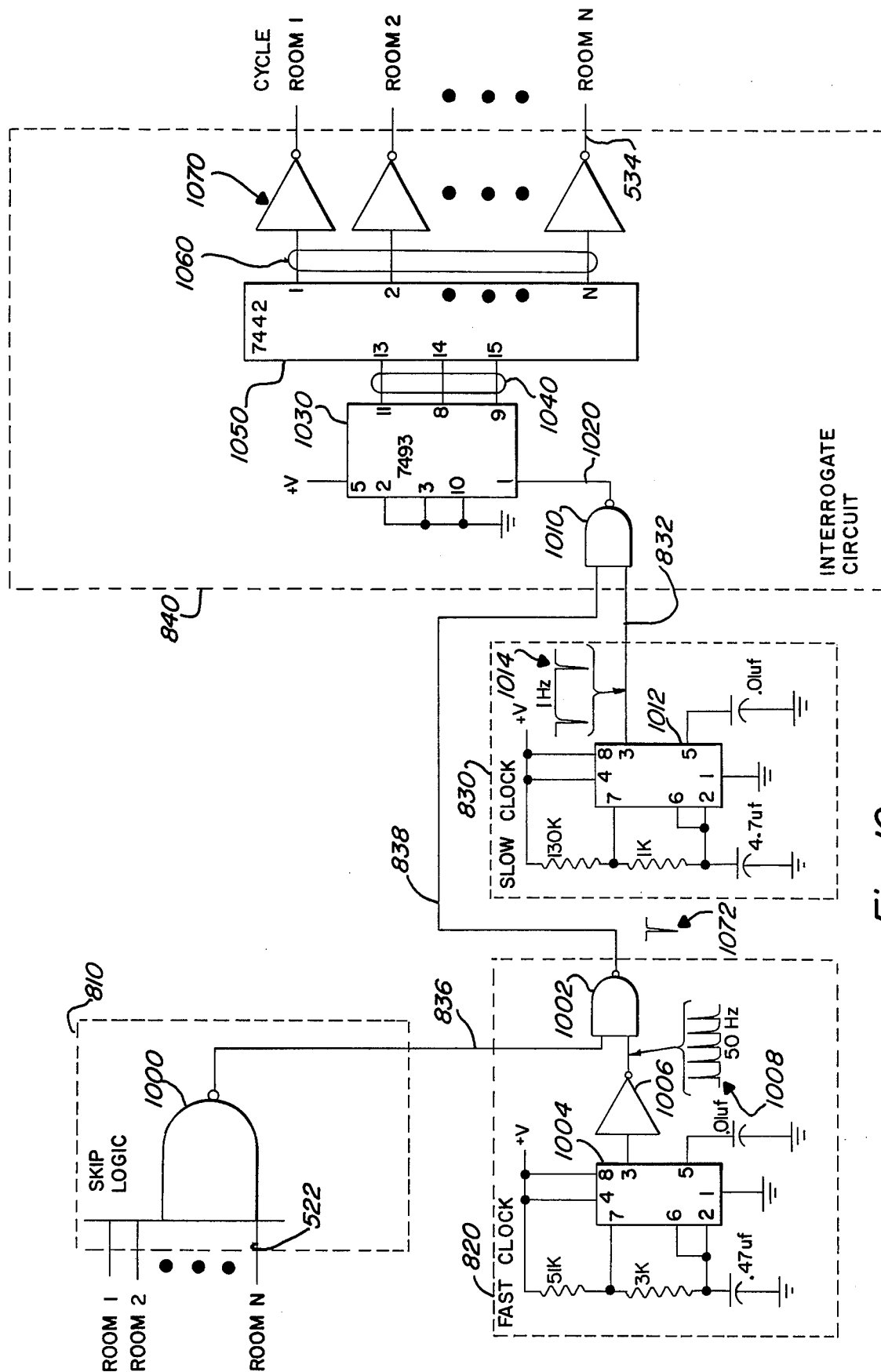
FIG. 10 is the electronic detailed circuit of the timing present in the preferred embodiment of the controller of the present invention as shown in FIG. 8.

The detailed electronic description of one preferred embodiment is shown in FIG. 10 to include an expanded NAND-gate 1000 in the skip logic circuit 810 wherein the skip input from each room is delivered to the input of gate 1000 which for room $n$ is lead 522. The output is delivered over lead 836 into NAND-gate 1002 found within the fast clock circuitry 820. The fast clock circuitry is conventionally delivered by a commercially available chip 1004 which may be, for example, model NE555 by National Semiconductor. The pin designations for the aforementioned NE555 are indicated as well as the various components necessary to produce a 50 Hz pulse at the output of inverter gate 1006 as shown by waveform 1008. The output of NAND-gate 1002 is delivered over lead 838 to input NAND-gate 1010 located with the interrogate circuit 840. The other input to NAND-gate 1010 is delivered over lead 832 from the slow clock circuit 830. Once again, the slow clock circuit is driven by an integrated circuit chip 1012 which is also a conventional NE555 whose pin interconnections are made to form a 1 Hz pulse output as shown by wave 1014. The output of NAND-gate 1010 is delivered over lead 1020 to access a conventional binary counter chip 1030 which may be for example a model DM7493 commercially available binary counter chip made by National Semiconductor. The outputs of the conventional binary counter are delivered over leads 1040 to access a conventional binary-to-decimal converter 1050 which may be, for example, the commercially available model DM442 made by National Semiconductor. The outputs of the binary-to-decimal converter chip 1050 are delivered over leads 1060 to a set of inverters 1070 which invert the output. For room $n$, the inverter 1070 accesses lead 534.

The operation of FIG. 10 will now be described. Normally, the interrogate circuit 840 is under control of pulses 1014 appearing on lead 832 from the slow clock 830. At this time, the input to NAND-gate 1010 is high thereby enabling transmittal of the slow clock pulses 1014 through to lead 1020. These pulses cause the chip 1030, which is a binary counter to count the incoming pulses and the binary-to-decimal converter 1050 causes each of the rooms to be interrogated by placing a low to high transition signal on the output lead which for room $n$ is lead 534. A low to high transition on the cycle lead 534 accesses as shown in FIG. 6 the switching logic 520. Thus, in normal operation, each set of switch logic 520 for each of the different rooms is interrogated to determine the temperature difference and to take the appropriate necessary action. In the event, however, upon that initial interrogation a skip pulse is delivered back from room $n$ on lead 522, then NAND-gate 1000 goes from a low to high transition thereby enabling gate 1002 to output a single pulse represented by wave 1072 to appear on lead 838 which is extended through NAND-gate 1010 to lead 1020 and causes the counter 1030 to immediately advance to the next count thereby effectuating the cycle output lead to advance to the next room. In this manner, in the event that a skip function is desired, the system can immediately respond by skipping that room and advancing to interrogate the next room's temperature difference status.

Figure 9:
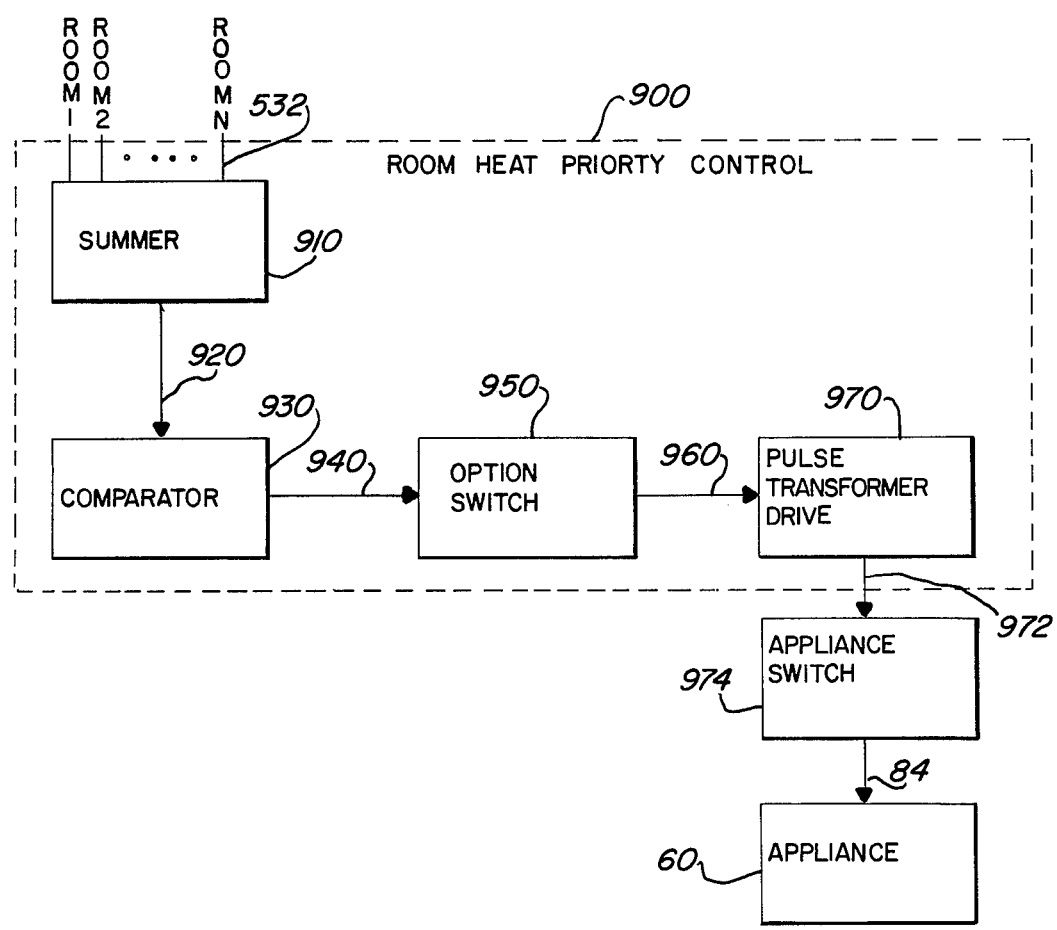
FIG. 9 is a block diagrammatic representation of the room heat priority control.

The remaining part of the control of the energy controller 10 of the present invention will now be discussed. In FIG. 9 is shown the optional room heat priority control 900, which includes a summer circuit 910 that is receptive of various summing inputs from each room which, for example, for room n is lead 532 and delivers an output on lead 920 to a comparator circuit 930. The output of the comparator circuit is delivered on lead 940 to an option switch 950 whose output is delivered over lead 960 to a pulse transformer drive 970. The output of the pulse transformer drive is delivered over lead 972 to the appliance switch 974 which activates the appliance 60 over lead 84. When more than four rooms have the heater 40 turned on full time, an output is issued on lead 920 to activate the comparator circuit 930, switch 950 and the pulse transformer drive 970 to turn off the appliance 60. In this mode of operation, the room heat has priority over the appliances.

Figure 11:
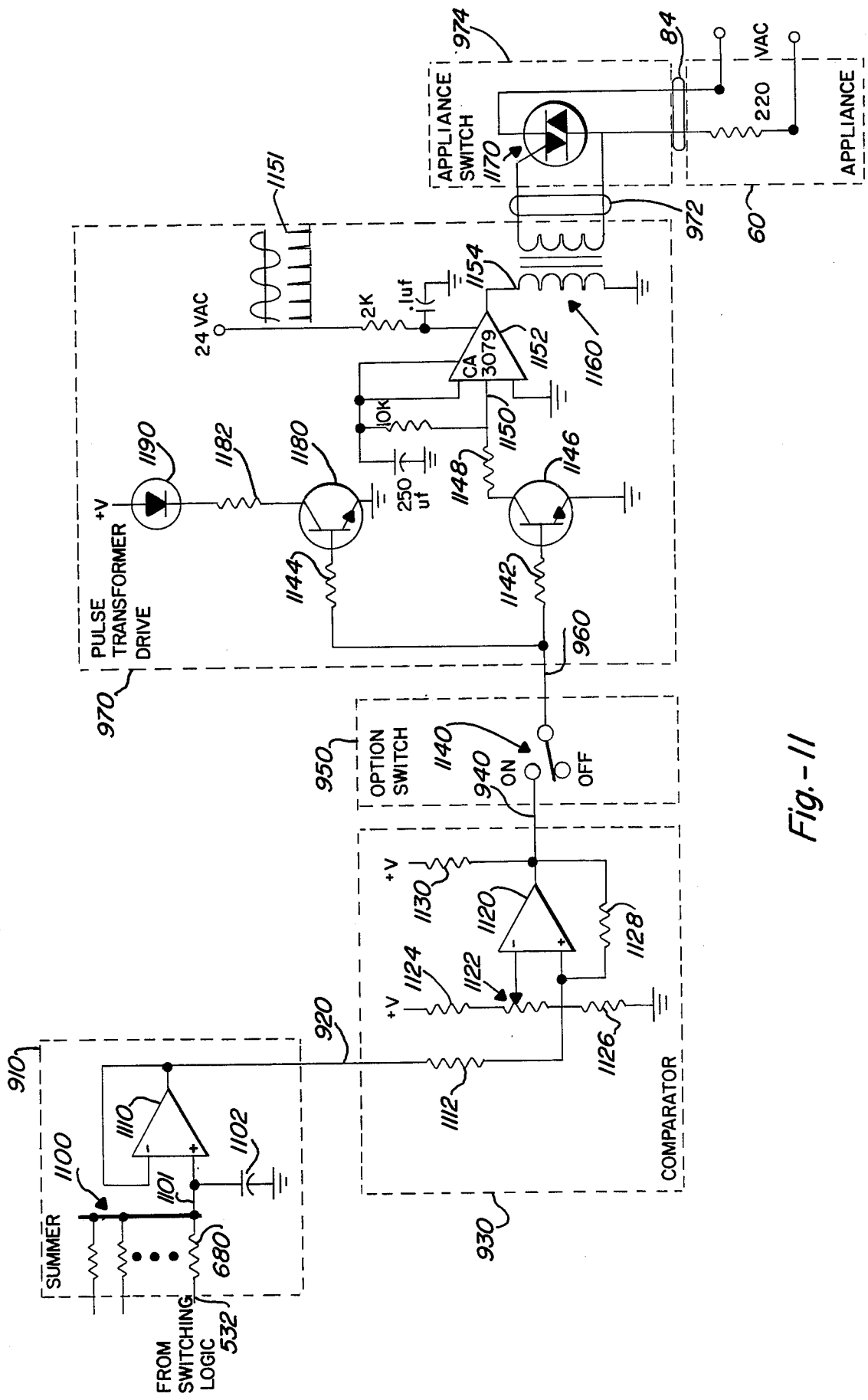
FIG. 11 is a detailed electronic schematic of the preferred room heat priority control circuit as shown in FIG. 9.

The detailed electronic circuit for the room heat priority control 900 shown in FIG. 9 is shown in FIG. 11 in one preferred embodiment. The summer 910 comprises a series of inputs from each of the summer outputs switching logic which for room $n$ is on lead 532. The output on lead 532 is delivered into a summing input 1100 which is connected through the capacitor 1102 to ground. It is further interconnected with the PLUS input of an operational amplifier 1110 such as National Semiconductor's LM324N, the output of which is connected back to the MINUS input over lead 920 and is further extended into a resistor 1112 found in the comparator circuit 930. The resistor 1112 is further interconnected to a PLUS input of amplifier 1120 made by National Semiconductor as LM339. The MINUS input is connected to the tap of a potentiometer 1122. One end of the potentiometer 1122 is biased through resistor 1124 to positive voltage and the other end is biased through resistor 1126 to ground. The output of the amplifier 1120 is fed back to the PLUS input through a resistor 1128, and is further biased through a resistor 1130 to positive voltage. The output of amplifier 1120 appears on lead 940 and accesses the option switch 950 which comprises a conventional toggle switch 1140. The output of the toggle switch 1140 is delivered over lead 960 into the pulse transformer drive 970 and specifically resistor 1142 and resistor 1144. The output of resistor 1142 accesses the base of transistor 1146, the emitter of which is grounded and the collector of which is interconnected in series with resistor 1148. The output of resistor 1148 is delivered over lead 1150 to input a zero crossing detector chip 1152 which is identical to the previous zero crossing chip 730. Chip 730 is a commercially available integrated circuit which is Model CA3079 manufactured by RCA and is interconnected conventionally as shown. The output of the chip 1152 is delivered over lead 1154 to a pulse transformer 1160. The output of the pulse transformer is interconnected over leads 972 with a solid state switch 1170 located in the appliance switch circuit 974. The output of the solid state switch 1170 is delivered over leads 84 to interact with the appliance 60. The resistor 1144 interconnects to the base of a transistor 1180 of which the emitter is grounded and the collector is interconnected through resistor 1182 to a light emitting diode 1190 and thence to positive voltage.

The following are preferred values for the various components:
Resistor 1112 — 1 Kohm
Potentiometer 1122 — 500 ohm
Resistor 1124 — 2 Kohm
Resistor 1126 — 1 Kohm
Resistor 1128 — 1 Mohm
Resistor 1130 — 10 Kohm
Resistor 1142 — 1 Kohm
Resistor 1144 — 1 Kohm
Resistor 1182 — 270 ohm
Resistor 1148 — 3.3 Kohm In operation, the circuitry of FIG. 11 becomes activated only when a predetermined number of rooms have the heater turned on full time. In that event, a signal appearing on the summer lead which for room n is 532 is delivered into the summing circuit 1100. When the voltage on lead 920 reaches a predetermined value, it is compared to a fixed value delivered to the MINUS input of operational amplifier 1120. That predetermined value may be varied by adjusting potentiometer 1122. In the preferred embodiment potentiometer 1122 is biased so that when four rooms have their heaters on, a high output appears on lead 940. Clearly any number of rooms can be selected by appropriate adjustment of potentiometer 1122. If the operator of the energy controller of the present invention has selected the ON position for switch 1140, the generated high signal is extended over lead 960 to the base of transistor 1180 thereby turning on the light emitting diode 1190 indicating that room heat priority is in effect. Furthermore, the high on lead 960 causes transistor 1146 to turn on thereby turning off the zero detector chip 1152. The output of chip 1152 on lead 1154 will now be low thereby preventing the appliance 60 from operating. In the event that less than four rooms, of the preferred embodiment, are not on full time, then the zero crossing chip 1152 will be turned on and a stream of output pulses as shown by wave 1151 will appear on lead 1154 to fire the appliance switch 1170.

If the user of the energy demand controller of the present invention selects both options shown in FIGS. 7 and 11, then the following occurs. When the various rooms or zones of the building have their actual temperature close to the desired value which is the normal mode of operation, any use by the inhabitant within the building of an appliance causes the current sensor 110 to issue an output thereby activating the current amplifier 554 to turn off the zero voltage switch 540 thereby prohibiting on lead 542 the activation of any heaters within the building. If while the appliances are on and having priority to the electrical power, the heat loss within the building becomes so great that the temperature drop in the various rooms goes beyond the seven degree difference, then if four or more rooms experience greater than a seven degree temperature variance, the summer circuit 910 becomes activated to produce a signal on lead 920 to activate the comparator which in turn inhibits the pulse transformer drive 970 over lead 960 thereby turning off electrical power to the appliance. In this mode of operation, the heaters in the four or more rooms are turned on full time and the appliances are deactivated. Clearly, should the user of the energy controller system of the present invention desire not to be inconvenienced by having the appliances turn off, then he can turn switch 1140 to the OFF position and the appliances will turn back on. If the operator does permit the heaters and the appliances to operate simultaneously, then he must expect to be charged at a higher demand billing rate for that particular month.

While only one appliance is considered in the preferred embodiment, clearly a plurality of appliances can be so controlled as shown in FIG. 4. Furthermore, the room heat priority control circuitry 900 shown in FIGS. 9 and 11 can be duplicated so that a different appliance 60 is controlled. Therefore, if four or five major appliances are sought to be individually controlled, the output of the comparator 930 on lead 940 can be delivered into five separate option switches, one for each different appliance. The output of each option switch would drive a corresponding pulse transformer drive and appliance switch. Indeed, the summer circuit 910 and the comparator 930 can also be provided for each different appliance so that an ordered priority control can be achieved. For example, it may be desired to turn off the first appliance when two or more rooms request the heater to be turned on on a full-time basis. The second appliance may have it's summer 910 to activate when three or more rooms request full-time heat. The third appliance may have its's summer 910 and comparator 930 arranged to be activated when five or more rooms request full time heat. Thus, priority access to the electrical power can be easily achieved under the teachings of the present invention. It is to be noted that adjustment of potentiometer 1122 and the comparator 930 shown in FIG. 11 controls the number of rooms to request full time heat before the output of the comparator makes a transition. The scope of this invention is, therefore, expressly not limited or delimited by the fact that the drawing illustrates the control of one appliance.

In a similar manner, while only one current sensor 110 was shown for one appliance in the drawing, the scope and teachings of the present invention contemplate the provision of a plurality of current sensors 110 and option switches 550, one set for each different high energy consuming appliance. The output of the option switch on lead 704 through resistor 706 can be duplicated to provide for such a plurality with the plurality of connections being made at the node between resistors 706 and 708.

To summarize the entire operation of the energy demand controller 10 of the present invention, the cycle logic 800 shown in FIG. 8 provides the basic timing for the system. The output of the interrogate circuit 840 is a series of approximately one-second pulses that interrogates the comparators 420 for each different room. The rooms 1 through n are continually interrogated as to the temperature difference status. In the event that no room comparator detects a temperature difference, a skip command is returned back to the cycle logic 800 permitting the interrogate circuit 840 to quickly advance to the next room and interrogate that room's status. The comparator 420 for a particular room continually monitors the temperature within the room with the sensor 100 and compares it to a predetermined set value at control 400. The difference is delivered from the sensor amplifier 500 over lead 502 and is compared to two sets of reference differences. In the preferred embodiment the first set is less than seven degrees and the second set is greater than seven degrees. Based on the magnitude, therefore, of the temperature difference between the actual temperature in the room and the desired temperature, the switching logic 520 outputs various states. If the temperature difference is zero, a skip command is issued to the cycle logic 800 to advance the interrogation to the next room. If the temperature difference of less than seven degrees is sensed, then a command is issued on lead 524 to turn the heater 40 associated with that room or zone on for one second. At the completion of the one-second cycle, slow clock 830 advances the interrogate logic 840 to interrogate the next room or zone's temperature difference status. In the event, however, when greater than seven degrees temperature difference is detected, then the JK flip-flop 674 locks it's position and turns the heater 40 on full time. The interrogate logic 840 receives a skip instruction and immediately advances to the next room. The heater for the prior room is now in a full time on position. This condition is delivered over lead 532 into a summer circuit 910 and if three other rooms have their heaters on full time and the option switch 950 is selected, then the appliances 60 will be deactivated. When the temperature in the room is brought back to a point two degrees less than desired, the JK flip-flop 674 is returned to it's normal state and the heater is turned off. However, while the cycle logic 800 is still within that state, the heater is turned on for the duration of the interrogation. When all of the rooms are within 7° of the desired level, and the option switch 550 shown in FIG. 7 is selected and an appliance is turned on, the cycle heating mode is deactivated and electrical consumption by the appliance is given priority.

Although the present invention has been described with a certain degree of particularity, it is understood that the present disclosure has been made by way of example and that changes in details of structure may be made without departing from the spirit thereof.

I claim:

1. An energy demand controller for allocating electrical power consumption between a first plurality of users and a second plurality of users, said controller comprising:
   means receptive of said electrical power for sequentially delivering said electrical power to each requesting one of said first plurality of users, and
   means responsive to a predetermined number of said plurality of second users using said electrical power for preventing said sequential delivery of power to said first users.

2. An energy demand controller for allocating electrical power consumption between a first plurality of users and a second plurality of users, said controller comprising:
   means receptive of said electrical power for sequentially delivering said electrical power to each requesting one of said first plurality of users,
   means responsive to a predetermined number of said plurality of second users using said electrical power for preventing said sequential delivery of power to said first users, and
   means operative upon a predetermined number of said requesting first users for deactivating the operation of said preventing means.

3. An energy demand controller for allocating electrical power consumption between a first plurality of users and a second plurality of users, said controller comprising:
   means receptive of said electrical power for sequentially delivering said electrical power to each requesting one of said first plurality of users, wherein said delivery means comprises:
   (a) means cooperative with each of said first plurality of users for determining whether said user requires said delivery,
   (b) means operative when said determining means determines that no delivery of said power is required by a first user for skipping to the next first user, and
   (c) means operative when said determining means determines that delivery of said power is required for a first user for extending said power to the user for a predetermined time interval before enabling said determining means to determine whether the next first user requires electrical power, and
   means responsive to a predetermined number of said plurality of second users using said electrical power for preventing said sequential delivery of power to said first users.

4. The energy demand controller of claim 1 wherein said preventing means comprises:
   means cooperative with each of said second users for indicating when a second user consumes said electrical power, and
   means responsive to said indication from said predetermined number of indications from said second users for preventing said sequential delivery of power to said first users.

5. An energy demand controller comprising:
   a plurality of heaters, each of said heaters located in a separate heating zone,
   means responsive to the temperature in each of said zones for activating the heater in said zone for a predetermined time interval when said temperature is below a predetermined value, and
   means cooperative with said plurality of activating means for enabling only one activating means to be activated during said predetermined time.

6. The energy demand controller of claim 5 wherein said activating means comprises:
   a sensor, said sensor located in said zone being responsive to the temperature in said zone for generating a signal proportional to said temperature,
   means receptive of said zone temperature signal from said sensor for producing a control signal when said zone temperature is below said predetermined value, and
   means receptive of said control signal for delivering electrical power to said heater.

7. The energy demand controller of claim 6 wherein said delivering means comprises:
   means for supplying electrical power, and
   means receptive of said electrical power and of said control signal for selectively extending said electrical power from said supplying means to said heater.

8. The energy demand controller of claim 6 wherein said producing means comprises:
   means for generating said predetermined value of temperature of said zone,
   means receptive of said generated predetermined temperature value and of said zone temperature signal for determining the difference between said predetermined value and said zone signal, and
   means operative upon said difference exceeding a given amount for generating said control signal.

9. The energy demand controller of claim 8 wherein said control signal generating means comprises:
   means for generating a cycle reference signal, and
   means receptive of said difference and of said cycle reference signal for producing a first control pulse when said difference is greater than said cycle reference in value.

10. The energy demand controller of claim 9 wherein said means for generating a cycle reference signal is variable.

11. The energy demand controller of claim 9 wherein said control signal generating means further comprises:
    means for generating an override reference signal, and
    means receptive of said difference and of said override reference signal for producing a second control pulse when said difference is greater than said override reference in value.

12. The energy demand controller of claim 11 wherein said means for generating said override reference signal is variable.

13. The energy demand controller of claim 11 wherein said override reference value is greater than said cycle reference value.

14. The energy demand controller of claim 13 further comprising means operative upon receipt of said second control pulse from a given number of said zones for preventing delivery of said electrical power to an electrical consumer other than said heaters.

15. The energy demand controller of claim 14 wherein said preventing means comprises:
means responsive to said given number of said second control pulses for generating a summing signal,
means receptive of said electrical power and of said summing signal for inhibiting the flow of said power to said other consumer.

16. The energy demand controller of claim 5 wherein said enabling means comprises:
a first clock for producing a series of first clock pulses,
means receptive of said first clock pulses for sequentially interrogating each of said activating means, only one of said activating means being interrogated during said predetermined time.

17. The energy demand controller of claim 15 wherein said enabling means further comprises:
a second clock for producing a series of second clock pulses, and
said interrogating means being receptive of said second clock pulses only when said temperature is equal to said predetermined value in said room.

18. The energy demand controller of claim 17 wherein said second series of clock pulses is at a higher frequency then said first series of clock pulses.

19. The energy demand controller of claim 5 further comprising;
means for sensing use of electrical power by an electrical consumer other than said heaters,
means operative upon the sensing of said consumer use for preventing the activation of said heater by said activating means for the duration of said use.

20. A method for controlling energy consumption within a building by a first plurality of users and by a second plurality of users, each of said first users having two levels of power requirements, said method comprising the steps of:
sequentially interrogating the power requests from each of said first users,
skipping to interrogate the request of the next first user in the event of no power request,
delivering power to the first user for a predetermined time interval before interrogating the power request of the next first user in response to a first level power request,
continually delivering power to the first user until the next power request interrogation in response to a second level power request, and
preventing any power delivery to said first users in response to any use of power by a second user.

21. The method of claim 20 for controlling energy consumption further comprising the steps of:
detecting when a predetermined number of first users request the second level of power, and
preventing any power delivery to the second users in response to said detection.

22. A method for controlling zone heaters in a building having a plurality of zones, said method comprising the steps of:
sequentially sensing the temperature for a predetermined time interval in each of the zones,
comparing the sensed temperature to a desired temperature during said predetermined time interval,
immediately skipping to sense the temperature in the next sequential zone when the difference between the sensed temperature and the desired temperature is less than a first amount,
turning the heater on in the zone for the predetermined time interval when the difference between the sensed temperature and the desired temperature is between the first amount and a second amount, and
turning the heater on in the zone until the next temperature sensing for that zone occurs when the difference between the sensed temperature and the desired temperature is greater than the second amount.

23. The method of claim 22 further comprising the steps of:
detecting when a predetermined number of heaters are turned on beyond the predetermined time interval, and
preventing the delivery of electrical power to a predetermined number of appliances in the building in response to said detection.

24. The method of claim 22 further comprising the steps of:
detecting when a predetermined number of appliances are using electrical power,
preventing the delivery of power to the heaters in response to said detection.

25. The method of claim 24 further comprising the steps of:
detecting when a predetermined number of heaters are turned on beyond the predetermined time interval, and
preventing the delivery of electrical power to a predetermined number of appliances in the building in response to said detection.

26. A method for controlling zone heaters in a building having a plurality of zones, said method comrpising the steps of:
sequentially sensing the temperature for a predetermined time interval in each of the zones,
comparing the sensed temperature to a desired temperature during said predetermined time interval,
immediately skipping to sense the temperature in the next sequential zone when the difference between the sensed temperature and the desired temperature is less than a first amount,
turning the heater on in the zone for the predetermined time interval when the difference between the sensed temperature and the desired temperature is between the first amount and a second amount,
turning the heater on in the zone until the next temperature sensing for that zone occurs when the difference between the sensed temperature and the desired temperature is greater than the second amount,
detecting when a predetermined number of heaters are turned on beyond the predetermined time interval,
preventing the delivery of electrical power to a predetermined number of appliances in the building in response to said detection,
detecting when a predetermined number of appliances are using electrical power, and
preventing the delivery of power to the heaters in response to said detection.

* * * * *